US012632488B2

(12) United States Patent
Li et al.

(10) Patent No.: US 12,632,488 B2
(45) Date of Patent: May 19, 2026

(54) PROCESSING METHOD AND APPARATUS FOR NOTIFICATION MESSAGE, AND SMART WEARABLE DEVICE

(71) Applicant: GOERTEK INC., Weifang (CN)

(72) Inventors: Huan Li, Weifang (CN); Junyu Luo, Weifang (CN)

(73) Assignee: GOERTEK INC., Weifang (CN)

( * ) Notice: Subject to any disclaimer, the term of this patent is extended or adjusted under 35 U.S.C. 154(b) by 266 days.

(21) Appl. No.: 18/255,412

(22) PCT Filed: Dec. 16, 2020

(86) PCT No.: PCT/CN2020/136974
§ 371 (c)(1),
(2) Date: Jun. 1, 2023

(87) PCT Pub. No.: WO2022/116278
PCT Pub. Date: Jun. 9, 2022

(65) Prior Publication Data
US 2024/0004914 A1 Jan. 4, 2024

(30) Foreign Application Priority Data
Dec. 1, 2020 (CN) ........................ 202011383074.X

(51) Int. Cl.
*G06F 16/353* (2025.01)
*G06F 16/387* (2019.01)
*G06F 40/205* (2020.01)

(52) U.S. Cl.
CPC .......... *G06F 16/353* (2019.01); *G06F 16/387* (2019.01); *G06F 40/205* (2020.01)

(58) Field of Classification Search
CPC .... G06F 16/353; G06F 16/387; G06F 40/205; G06F 16/909; G06F 16/245; G06F 16/248; G06F 16/29
See application file for complete search history.

(56) References Cited

U.S. PATENT DOCUMENTS

| | | | | | |
|---|---|---|---|---|---|
| 6,108,674 A | * | 8/2000 | Murakami | .............. | G06F 18/40 707/E17.026 |
| 2016/0127486 A1 | * | 5/2016 | Chen | .................... | H04W 4/029 709/206 |

(Continued)

FOREIGN PATENT DOCUMENTS

| | | |
|---|---|---|
| CN | 102957742 A | 3/2013 |
| CN | 103399860 A | 11/2013 |

(Continued)

OTHER PUBLICATIONS

International Search Report from International Application No. PCT/CN2020/136974 mailed Aug. 30, 2021.

*Primary Examiner* — Linda Wong
(74) *Attorney, Agent, or Firm* — Shih IP Law Group, PLLC

(57) ABSTRACT

Disclosed are a processing method and a processing apparatus for notification message, and a smart wearable device. The method includes: receiving classification identifiers and keyword information corresponding to the classification identifiers; dividing an independent storage area for each of the classification identifiers, and recording keyword information corresponding to each storage area; when a notification message is received, parsing word information contained in the notification message; storing the notification message to a corresponding storage area according to matching relationship between the word information and the keyword information; and selecting a target storage area matching with the word information contained in a message reading instruction, and reading the notification message from the target storage area. In the present application, by dividing different storage areas for storing different types of notification messages, the required notification message is (Continued)

receiving classification identifiers and keyword information corresponding to the classification identifiers — S101 dividing an independent storage area for each classification identifier, and recording keyword information corresponding to each storage area — S102 when the notification message is received, parsing word information contained in the notification message — S103 storing the notification message into a corresponding storage area according to the matching relation between the word information and the keyword information — S104 when a message reading instruction is received, selecting a target storage area matching with word information contained in the message reading instruction, and reading the notification message from the target storage area — S105 directly read from the corresponding storage area when the notification message is read subsequently.

8 Claims, 2 Drawing Sheets

(56)                References Cited

U.S. PATENT DOCUMENTS

2018/0321992 A1    11/2018  Chen et al.
2019/0228270 A1 *   7/2019  Deluca ................ G06F 16/5846

FOREIGN PATENT DOCUMENTS

| CN | 107181673 A | 9/2017 |
|---|---|---|
| CN | 108491535 A | 9/2018 |
| CN | 109120789 A | 1/2019 |
| CN | 111290673 A | 6/2020 |
| WO | WO-2020062788 A1 * | 4/2020 |

* cited by examiner

PROCESSING METHOD AND APPARATUS FOR NOTIFICATION MESSAGE, AND SMART WEARABLE DEVICE

The present application claims the priority of the Chinese Patent Application No. 202011383074.X, titled "PROCESSING METHOD AND APPARATUS FOR NOTIFICATION MESSAGE, AND SMART WEARABLE DEVICE" filed in China Patent Office on Dec. 1, 2020, the entire contents of which are incorporated into the present application by reference.

TECHNICAL FIELD

The present application relates to a technical field of information processing, and more particularly, to a processing method and a processing apparatus for notification message, and a smart wearable device.

DESCRIPTION OF RELATED ART

With the rapid improvement of informatization level, smart wearable devices, such as smart bracelets and smart watches, are becoming more and more popular. Different application programs can be installed in the smart watch by users and different notification messages may be received by the smart watch.

After the smart wearable device receives the notification message, the user only needs to raise his/her wrist to read the notification message. However, when there are many notification messages, if the user wants to read the old messages once again, the user may have to browse through the message contents one by one, as a result, a poor experience occurs and the message content required by the user cannot be quickly obtained.

Therefore, the problem to be solved by those skilled in the art is to improve the efficiency for users to obtain message content.

SUMMARY

An object of the embodiments of the present application is to provide a processing method and a processing apparatus for notification message, and a smart wearable device, which can improve the efficiency for users to obtain message content.

In order to solve the above technical problem, an embodiment of the present application provides a processing method for notification message, including following steps:

receiving classification identifiers and keyword information corresponding to the classification identifiers;

dividing an independent storage area for each of the classification identifiers, and recording keyword information corresponding to each storage area;

when the notification message is received, parsing word information contained in the notification message;

storing the notification message to a corresponding storage area according to matching relationship between the word information and the keyword information; and when a message reading instruction is received, selecting a target storage area matching with word information contained in the message reading instruction, and reading the notification message from the target storage area.

Optionally, the step of storing the notification message to a corresponding storage area according to matching relationship between the word information and the keyword information includes:

determining whether there is a target keyword matching with the word information in the keyword information;

if there is a target keyword matching with the word information in the keyword information, storing the notification message to an independent storage area corresponding to the target keyword; and if there is no target keyword matching with the word information, storing the notification message to a common message storage area.

Optionally, after the step of storing the notification message to a corresponding storage area according to matching relationship between the word information and the keyword information, the processing method for notification message further includes:

presenting a notification message corresponding to the classification identifier with a highest priority according to set priority orders for the classification identifiers.

Optionally, after the step of reading the notification message from the target storage area, the processing method for notification message further includes:

parsing feature information from the notification message stored in the target storage area according to a data presenting regulation corresponding to the target storage area, and presenting the feature information.

Optionally, after the step of dividing an independent storage area for each of the classification identifiers, the processing method for notification message further includes:

when a target classification identifier and its corresponding location information are acquired, recording corresponding relationship between the location information and the storage area corresponding to the target classification identifier, wherein the target classification identifier is any one of all the classification identifiers.

Optionally, after the step of when a target classification identifier and its corresponding location information are acquired, recording corresponding relationship between the location information and the storage area corresponding to the target classification identifier, the processing method for notification message further includes:

when the acquired current location information matches with the target location information recorded in the corresponding relationship, presenting a notification message stored in the storage area corresponding to the target location information.

Optionally, after the step of when a target classification identifier and its corresponding location information are acquired, recording corresponding relationship between the location information and the storage area corresponding to the target classification identifier, the processing method for notification message further includes:

when the acquired current location information matches the target location information recorded in the corresponding relationship, performing a vibration or voice prompt.

An embodiment of the present application further provides a processing apparatus for notification message, including a receiving unit, a dividing unit, a recording unit, a parsing unit, a storage unit and a reading unit;

the receiving unit is configured to receive classification identifiers and keyword information corresponding to the classification identifiers;

the dividing unit is configured to divide an independent storage area for each of the classification identifiers;

the recording unit is configured to record keyword information corresponding to each storage area;

the parsing unit is configured to parse word information contained in a notification message when the notification message is received;

the storage unit is configured to store the notification message to a corresponding storage area according to matching relationship between the word information and the keyword information; and the reading unit is configured to select a target storage area matching word information contained in the message reading instruction and read the notification message from the target storage area when receiving a message reading instruction.

Optionally, the storage unit includes a determining subunit, a first storage subunit and a second storage subunit;

the determining subunit is configured to judge whether there is a target keyword matching with the word information in the keyword information;

the first storage subunit is configured to store the notification message to an independent storage area corresponding to the target keyword if there is a target keyword matching with the word information in the keyword information; and the second storage subunit is configured to store the notification message to a common message storage area if there is no target keyword matching with the word information in the keyword information.

Optionally, the processing apparatus for notification message also includes a first presenting unit;

the first presenting unit is configured to present a notification message corresponding to the classification identifier with the highest priority according to the set priority orders for the classification identifiers.

Optionally, the processing apparatus for notification message also includes a second presenting unit;

the second presenting unit is configured to parse feature information from the notification message stored in the target storage area according to a data presenting regulation corresponding to the target storage area, and present the feature information.

Optionally, the recording unit is further configured to record the corresponding relationship between the location information and the storage area corresponding to the target classification identifier when a target classification identifier and its corresponding location information are acquired, wherein the target classification identifier is any one of all the classification identifiers.

Optionally, the processing apparatus for notification message also includes a third presenting unit;

the third presenting unit is configured to present the notification message stored in the storage area corresponding to the target location information when the acquired current location information matches the target location information recorded in the corresponding relationship.

Optionally, the processing apparatus for notification message also includes a prompt unit;

the prompt unit is configured to perform a vibration or voice prompt when the acquired current location information matches the target location information recorded in the corresponding relationship.

An embodiment of the present application further provides a smart wearable device, including a processor and an input display module; the processor is configured to perform the steps of the processing method for notification message according to any one of the above-described items;

the input display module is connected to the processor and is configured to receive classification identifiers input by a user and keyword information corresponding to the classification identifiers, and the input display module transmits the classification identifiers and keyword information corresponding to the classification identifiers to the processor.

Optionally, the processing apparatus for notification message also includes a positioning module;

the positioning module is configured to collect current location information of the smart wearable device;

wherein the input display module is configured to receive location information added for a target classification identifier, and transmit the target classification identifier and its corresponding location information to the processor, wherein the target classification identifier is any one of all the classification identifiers;

wherein the processor is configured to record corresponding relationship between location information and the storage area corresponding to the target classification identifier when the location information corresponding to the target classification identifier is acquired.

It can be seen from the above technical solutions that the present application includes: receiving classification identifiers and keyword information corresponding to the classification identifiers, the classification identifiers being used to distinguish different types of notification messages; dividing an independent storage area for each of the classification identifiers, and recording keyword information corresponding to each storage area; when a notification message is received, parsing word information contained in the notification message; storing the notification message to a corresponding storage area according to matching relationship between the word information and the keyword information; and by mean of storing different types of notification messages in different storage areas, when a message reading instruction is received, selecting a target storage area matching with the word information contained in a message reading instruction, and reading the notification message from the target storage area. Compared with querying the required notification messages from a large number of notification messages in the conventional method, in the present application, by dividing different storage areas for storing different types of notification messages, the required notification message is directly read out from the corresponding storage area when the notification message is read subsequently, so that a user can read the required notification message content more quickly, and the efficiency of acquiring the message content by the user is improved.

BRIEF DESCRIPTION OF DRAWINGS

In order to more clearly illustrate the embodiments of the present application or the technical solutions in the prior art, the drawings required to be used for the content of the embodiments or the prior art will be briefly introduced in the following. Obviously, the drawings in the following description are merely a part of the drawings of the present application, and for those of ordinary skill in the art, other drawings can also be obtained from the provided drawings without any creative effort.

DETAILED DESCRIPTIONS

With reference to the drawings in the embodiments of the present application, the following will describe the technical solutions in the embodiments of the present application. Obviously, the described embodiments are only some of the embodiments of the application, not all of them. Based on the embodiments in the present application, all other embodiments obtained by persons of ordinary skill in the art without any creative efforts fall within the protection scope of the present application.

In order to enable those skilled in the art to better understand the solutions of the present application, the present application will be further described in detail below in conjunction with the drawings and specific implementations.

Figure 1:
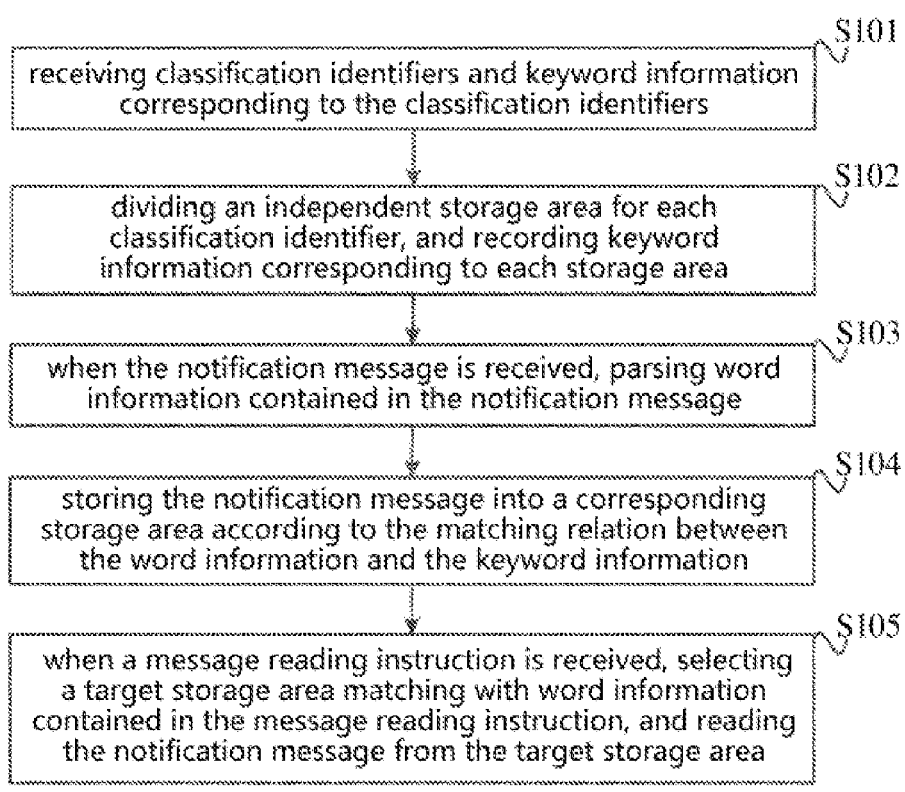
FIG. 1 is a flowchart of a processing method for notification message provided by an embodiment of the present application.

Next, a processing method for notification message provided by an embodiment of the present application is introduced in detail. FIG. 1 is a flowchart of a processing method for notification message provided by an embodiment of the present application. The processing method for notification message includes:

S101, receiving classification identifiers and keyword information corresponding to the classification identifiers.

The classification identifiers may be used to distinguish different types of notification messages. The classification identifiers may be expressed by words or indicated by pictures, graphics, etc. In this embodiment of the present application, the specific form of the classification identifiers is not limited.

The processing method for notification message provided by the embodiment of the present application may be applied to smart devices used by users and can process notification messages received by the smart devices.

Wherein, there are many types of smart devices, for example, smart phones, smart wearable devices, and the like. The smart wearable devices may be smart bracelets, smart watches, and the like.

In the conventional method, generally, notification messages received by smart devices are stored to a designated position, and when the number of notification messages is large, if the user needs to read several previous notification messages, the user have to read from a large number of notification messages one by one to obtain the required notification message. In the embodiment of the present application, in order to facilitate the user to quickly obtain the required notification message, when the notification messages are stored, the notification messages can be classified and stored.

In practical applications, users can classify different classification identifiers according to common types of notification messages, and each classification identifier represents a type of notification message. For each classification identifier, its corresponding keyword information can be set.

S102, dividing an independent storage area for each of the classification identifiers, and recording keyword information corresponding to each storage area.

In order to quickly find the notification message required by the user, in the embodiment of the present application, for each type of classification identifier, a corresponding independent storage area can be set. Each independent storage area has its corresponding keyword information.

Taking smart wearable devices as an example, smart wearable devices can establish a connection with the user's smart phone, to receive messages transmitted by the smart phone, such as express delivery information, life payment notification information, etc.; smart wearable devices can also detect the user's movement condition, such as number of exercise steps, heart rate and other data; smart wearable devices can also acquire weather information through the Internet. In practical applications, according to the type of notification message received by the smart wearable device, the classification identifiers can be divided into express delivery, payment, weather, number of steps, heart rate, etc.

The keyword information may be a representative word in the notification message. For example, when the notification message is a message of picking up express delivery, the keyword information may be "express delivery", "pickup", "pickup code" and the like.

S103, when a notification message is received, parsing word information contained in the notification message.

Parsing word information contained in the notification message belongs to the existing relatively well-known technology, and will not be described in detail here. For example, when a notification message is received, word separation may be performed on the notification message, and then regular words contained in the separated word may be deleted, so as to obtain required word information.

S104, storing the notification message to a corresponding storage area according to matching relationship between the word information and the keyword information.

The matching relation between the word information and the keyword information may be used to determine whether a target keyword matching with the word information exists in the keyword information corresponding to each storage area.

If there is a target keyword matching the word information, it means that the currently received notification message has its matching classification identifier. At this time, the notification message can be stored to an independent storage area corresponding to the target keyword.

If there is no target keyword matching with the word information, it means that the currently received notification message does not have a matching classification identifier. At this time, the notification message can be stored to a common message storage area.

S105, when a message reading instruction is received, selecting a target storage area matching word information contained in the message reading instruction, and reading the notification message from the target storage area.

Each independent storage area has its corresponding keyword information. When the word information contained in the message reading instruction matches the keyword information of a certain independent storage area, this independent storage area is the target storage area.

When none of the word information contained in the message reading instruction matches the keyword information in all independent storage area, the common message storage area can be used as the target storage area, and the notification message can be read from the common message storage area.

It can be seen from the above technical solutions that the present application includes: receiving classification identifiers and keyword information corresponding to the classification identifiers, the classification identifiers being used to distinguish different types of notification messages; dividing an independent storage area for each of the classification identifiers, and recording keyword information corresponding to each storage area; when a notification message is received, parsing word information contained in the notification message; storing the notification message to a corresponding storage area according to matching relationship between the word information and the keyword information; and by mean of storing different types of notification messages to different storage areas, when a message reading instruction is received, selecting a target storage area matching with the word information contained in a message reading instruction, and reading the notification message from the target storage area. Compared with querying the required notification messages from a large number of notification messages in the traditional method, in the present application, by means of dividing different storage areas for storing different types of notification messages, the required notification message is directly read from the corresponding storage area when the notification message is read subsequently, so that a user can read the required notification message content more quickly, and the efficiency of obtaining the message content by the user is improved.

In the embodiment of the present application, the latest received notification messages may be presented in the order that the notification messages are received. Besides, the notification message corresponding to the classification identifier with the highest priority may be presented according to the set priority orders for the classification identifiers.

Taking the classification identifiers including express delivery, payment, weather, number of steps, and heart rate as an example, assuming that express delivery has the highest priority, if currently received are a notification message whose information type is express delivery and a notification message whose information type is weather, a notification message whose information type is express delivery can be preferentially presented.

In practical applications, users can set the priority order according to their needs for information acquisition. By presenting the notification messages with the highest priority, users can intuitively grasp the notification messages they want to read most, so that improve the user experience.

Taking smart wearable devices as an example, amount of information which can be displayed by the display screen of smart wearable devices is limited. In order to facilitate users to quickly obtain more effective information, corresponding data presentation regulation can be set for each type of notification message. After selecting a target storage area matching word information contained in the message reading instruction and reading the notification message from the target storage area, feature information can be parsed from the notification message stored in the target storage area according to the data presentation regulation corresponding to the target storage area, and can be displayed.

The data presentation regulation may be used to represent the content of data information required to be presented. Taking the notification message of picking up express delivery as an example, a piece of notification message generally contains a paragraph of information content, from which "pickup code" and "digital content" corresponding to the pickup code can be parsed, for example, the parsed feature information is pick-up code 678321.

Feature information belongs to the representative information content among the notification message. By parsing the feature information from the notification message, it is convenient for the user to intuitively obtain important information contained in the notification message. Furthermore, compared to displaying one piece of notification message, multiple pieces of feature information can be presented on the display screen at the same time.

In the embodiment of the present application, in addition to recording the keyword information respectively corresponding to storage area for each classification identifier, location information may also be set for each classification identifier. In practical applications, it may be, when a target classification identifier and its corresponding location information are acquired, recording the corresponding relationship between the storage area corresponding to the target classification identifier and the location information, wherein the target classification identifier is any one of all the classification identifiers.

Taking smart wearable device as an example, the smart wearable device is provided with a positioning module, so that being capable of acquiring the current location information of the smart wearable device. When the acquired current location information matches the target location information recorded in the corresponding relationship, the notification message stored in the storage area corresponding to the target location information can be displayed.

For example, the smart wearable device stores location information on each express delivery location, when the user passes a certain express delivery place of receiving goods, the notification message recorded in the storage area corresponding to the classification identifier of "express delivery" can be presented. In a specific implementation, the notification information corresponding to the current express delivery place for receiving goods can be further selected out from the notification messages recorded in the storage area corresponding to the classification identifier of "express delivery", so as to present the notification information corresponding to the current express delivery place for receiving goods.

In practical applications, when the user passes the location corresponding to the location information recorded in the corresponding relationship, in order to facilitate the user to read the notification message corresponding to this location in time, smart wearable device may perform a vibration or voice prompt when the acquired current location information matches the target location information recorded in the corresponding relationship.

By adding corresponding location information to the classification identifier and setting a prompt mechanism, the storing and reading operation of the notification message is further improved, so that the presenting of the notification message can meet the actual application requirements.

Figure 2:
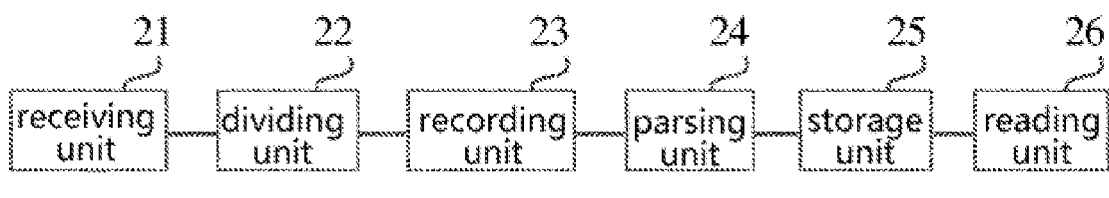
FIG. 2 is schematic structural diagram of a processing apparatus for notification message provided by an embodiment of the present application.

FIG. 2 is schematic structural diagram of a processing apparatus for notification message provided by an embodiment of the present application, the processing apparatus for notification message includes a receiving unit 21, a dividing unit 22, a recording unit 23, a parsing unit 24, a storage unit 25 and a reading unit 26;

the receiving unit 21 is configured to receive classification identifiers and keyword information corresponding to the classification identifiers;

the dividing unit 22 is configured to divide an independent storage area for each of the classification identifiers;

the recording unit 23 is configured to record keyword information corresponding to each storage area;

the parsing unit 24 is configured to parse word information contained in a notification message when the notification message is received;

the storage unit 25 is configured to store the notification message to a corresponding storage area according to matching relationship between the word information and the keyword information; and the reading unit 26 is configured to select a target storage area matching word information contained in the message reading instruction and read the notification message from the target storage area when receiving a message reading instruction.

Optionally, the storage unit includes a determining subunit, a first storage subunit and a second storage subunit;

the determining subunit is configured to determine whether there is a target keyword matching with the word information in the keyword information;

the first storage subunit is configured to store the notification message to an independent storage area corresponding to the target keyword if there is a target keyword matching with the word information in the keyword information; and the second storage subunit is configured to store the notification message to a common message storage area if there is no target keyword matching with the word information in the keyword information.

Optionally, the processing apparatus for notification message also includes a first presenting unit;

the first presenting unit is configured to present a notification message corresponding to the classification identifier with the highest priority according to the set priority orders for the classification identifiers.

Optionally, the processing apparatus for notification message also includes a second presenting unit;

the second presenting unit is configured to parse feature information from the notification message stored in the target storage area according to a data presenting regulation corresponding to the target storage area, and present the feature information.

Optionally, the recording unit is further configured to record the corresponding relationship between the location information and the storage area corresponding to the target classification identifier when a target classification identifier and its corresponding location information are acquired, wherein the target classification identifier is any one of all the classification identifiers.

Optionally, the processing apparatus for notification message also includes a third presenting unit;

the third presenting unit is configured to present the notification message stored in the storage area corresponding to the target location information when the acquired current location information matches the target location information recorded in the corresponding relationship.

Optionally, the processing apparatus for notification message also includes a prompt unit;

the prompt unit is configured to perform a vibration or voice prompt when the acquired current location information matches the target location information recorded in the corresponding relationship.

For descriptions of features in the embodiment corresponding to FIG. 2, reference may be made to relevant descriptions of the embodiment corresponding to FIG. 1, and details will not be repeated here.

It can be seen from the above technical solutions that the present application includes: receiving classification identifiers and keyword information corresponding to the classification identifiers, the classification identifiers being used to distinguish different types of notification messages; dividing an independent storage area for each of the classification identifiers, and recording keyword information corresponding to each storage area; when a notification message is received, parsing word information contained in the notification message; storing the notification message to a corresponding storage area according to matching relationship between the word information and the keyword information;

and by means of storing different types of notification messages in different storage areas, when a message reading instruction is received, selecting a target storage area matching with the word information contained in a message reading instruction, and reading the notification message from the target storage area. Compared with querying the required notification messages from a large number of notification messages in the conventional method, in the present application, by dividing different storage areas for storing different types of notification messages, the required notification message is directly read out from the corresponding storage area when the notification message is read subsequently, so that a user can read the required notification message content more quickly, and the efficiency of obtaining the message content by the user is improved.

Figure 3:
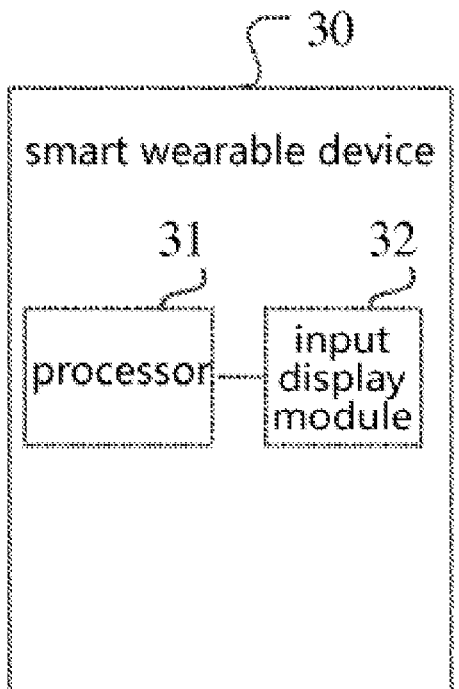
FIG. 3 is schematic structural diagram of a smart wearable device provided by an embodiment of the present application.

FIG. 3 is schematic structural diagram of a smart wearable device 30 provided by an embodiment of the present application, including a processor 31 and an input display module 32; the processor 31 is configured to perform the steps of the processing method for notification message according to any one of the above-described embodiments;

the input display module 32 is connected to the processor 31 and is configured to receive classification identifiers input by a user and keyword information corresponding to the classification identifiers, and transmit the classification identifiers and keyword information corresponding to the classification identifiers to the processor 31.

Optionally, the processing apparatus for notification message also includes a positioning module;

the positioning module is configured to collect current location information of the smart wearable device;

the input display module 32 is configured to receive location information added for a target classification identifier, and transmit the target classification identifier and its corresponding location information to the processor 31, wherein the target classification identifier is any one of all the classification identifiers;

the processor 31 is configured to record the corresponding relationship between the location information and the storage area corresponding to the target classification identifier when the location information corresponding to the target classification identifier is acquired.

In the embodiment of the present application, the positioning module may adopt a GPS positioning module or a Beidou positioning module or other positioning modules, and the current location information such as latitude, longitude and altitude of the smart wearable device 30 can be obtained through the positioning module.

In practical applications, in order to improve the functions of the smart wearable device 30, a mobile communication module may be provided on the smart wearable device 30. The smart wearable device 30 can realize connection with an external network through the mobile communication module, for example, the smart wearable device 30 can realize the connection with the Internet.

Here, the mobile communication module may adopt a 4G mobile communication module or a 5G mobile communication module or the like. In the embodiment of the present application, the type of the mobile communication module is not limited.

In order to realize communication connection between the smart wearable device 30 and the user's smart phone or connection between the smart wearable device 30 and an external network, a Bluetooth module or a WiFi module may be provided on the smart wearable device 30. The smart wearable device 30 may be connected to an external Bluetooth master device or a WiFi hotspot or a LAN router through the Bluetooth module or the WiFi module, and thereby the smart wearable device 30 is connected to an external device or an external network.

In the embodiment of the present application, an audio module may be provided on the smart wearable device 30, and the audio module may include an audio decoding unit, an audio operational amplifier unit, a loudspeaker, etc., for playing audio content.

In the embodiment of the present application, a wrist raising detection module may be provided on the smart wearable device 30, and the wrist raising detection module may include an acceleration sensor unit, a gyroscope sensor unit, etc., and can detect the user's wrist raising action and notify the processor 31.

In practical applications, for example, when the user is at the express delivery location, after the user raises his/her wrist, the processor 31 reads the notification message from the storage area corresponding to the location information and presents the notification message through the input display module 32. If the notification message is a content containing digital information, for example "express delivery" message, then key content information such as a pickup code can be parsed out so that the users can quickly read the notification message.

For descriptions of features in the embodiment corresponding to FIG. 3, reference may be made to relevant descriptions of the embodiment corresponding to FIG. 1, and details will not be repeated here.

It can be seen from the above technical solutions that the present application includes: receiving classification identifiers and keyword information corresponding to the classification identifiers, the classification identifiers being used to distinguish different types of notification messages; dividing an independent storage area for each of the classification identifiers, and recording keyword information corresponding to each storage area; when a notification message is received, parsing word information contained in the notification message; storing the notification message to a corresponding storage area according to matching relationship between the word information and the keyword information; and by storing different types of notification messages to different storage areas, when a message reading instruction is received, selecting a target storage area matching with the word information contained in a message reading instruction, and reading the notification message from the target storage area. Compared with querying the required notification messages from a large number of notification messages in the conventional method, in the present application, by means of dividing different storage areas for storing different types of notification messages, the required notification message is directly read from the corresponding storage area when the notification message is read subsequently, so that a user can read the required notification message content more quickly, and the efficiency of obtaining the message content by the user is improved.

A processing method and a processing apparatus for notification message, and a smart wearable device provided in the embodiments of the present application are described above in detail. The various embodiments in the present specification are described in a progressive manner, and each embodiment focuses on the differences from other embodiments, and the same and similar parts between the various embodiments can be referred to each other. As for the apparatus disclosed in the embodiment, since it corresponds to the method disclosed in the embodiment, the description is relatively simple. For relevant parts, please refer to the description of the method. It will be understood that those skilled in the art can make several improvements and modifications to the application without departing from the principles of the application, and these improvements and modifications also fall within the protection scope of the claims of the application.

Those of ordinary skill in the art will understand that the units and algorithm steps of each example described in conjunction with the embodiments disclosed herein can be implemented by electronic hardware, computer software, or a combination thereof. In order to clearly explain the interchangeability between hardware and software, the composition and steps of each example have been generally described in the above descriptions in terms of function. Whether these functions are performed by hardware or software depends on the specific application and design constraints of the technical solution. Those skilled in the art may implement the described functions by using different methods for each specific application, but such implementations should not be considered beyond the scope of the present application.

The steps of the method or algorithm described in connection with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium well known in the art.

The various embodiments in this specification are described in a parallel or progressive manner, and each embodiment focuses on the differences from other embodiments, and the same or similar parts between the various embodiments may be referred to each other. As for the device disclosed in the embodiment, since it corresponds to the method disclosed in the embodiment, the description is relatively simple. For relevant parts, please refer to the description of the method.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or device that includes a series of elements includes not only those elements, but also other elements not explicitly listed, or elements inherent to such a process, method, article or device. Without further limitation, the element defined by the phrase "comprising a . . . " does not preclude the presence of additional identical elements in the process, method, article or apparatus including the element.

What is claimed is:

1. A processing method for notification message, comprising:

receiving classification identifiers and keyword information corresponding to the classification identifiers;

dividing an independent storage area for each of the classification identifiers, and recording keyword information corresponding to each storage area;

when the notification message is received, parsing word information contained in the notification message;

storing the notification message to a corresponding storage area according to matching relationship between the word information and the keyword information;

when a message reading instruction is received, selecting a target storage area matching with word information contained in the message reading instruction, and reading the notification message from the target storage area; and parsing feature information from the notification message stored in the target storage area according to a data presenting regulation corresponding to the target storage area, and presenting the feature information, wherein the feature information belongs to representative information content among the notification message, wherein storing the notification message to the corresponding storage area according to matching relationship between the word information and the keyword information comprises:

determining whether there is a target keyword matching with the word information in the keyword information;

if there is a target keyword matching with the word information in the keyword information, storing the notification message to an independent storage area corresponding to the target keyword; and if there is no target keyword matching with the word information in the keyword information, storing the notification message to a common message storage area.

2. The processing method for notification message according to claim 1, wherein after storing the notification message to the corresponding storage area according to matching relationship between the word information and the keyword information, the processing method for notification message further comprises:

presenting a notification message corresponding to the classification identifier with a highest priority according to set priority orders for the classification identifiers.

3. The processing method for notification message according to claim 1, wherein after dividing the independent storage area for each of the classification identifiers, the processing method for notification message further comprises:

when a target classification identifier and its corresponding location information are acquired, recording corresponding relationship between the location information and the storage area corresponding to the target classification identifier, wherein, the target classification identifier is any one of all the classification identifiers.

4. The processing method for notification message according to claim 3, wherein after recording corresponding relationship between the location information and the storage area corresponding to the target classification identifier, the processing method for notification message further comprises:

when an acquired current location information matches with a target location information recorded in the corresponding relationship, presenting a notification message stored in the storage area corresponding to the target location information.

5. The processing method for notification message according to claim 3, wherein after recording corresponding relationship between the location information and the storage area corresponding to the target classification identifier, the processing method for notification message further comprises:

when an acquired current location information matches with a target location information recorded in the corresponding relationship, performing a vibration or a voice prompt.

6. A processing apparatus for notification message, comprising:

a receiver configured to receive classification identifiers and keyword information corresponding to the classification identifiers;

a divider configured to divide an independent storage area for each of the classification identifiers;

a recorder configured to record keyword information corresponding to each storage area;

a parser configured to parse word information contained in the notification message when the notification message is received;

a storage configured to store the notification message to a corresponding storage area according to matching relationship between the word information and the keyword information; and a presenter configured to parse feature information from the notification message stored in the target storage area according to a data presenting regulation corresponding to the target storage area, and present the feature information, wherein the feature information belongs to representative information content among the notification message, wherein the storage is configured to: determine whether there is a target keyword matching with the word information in the keyword information;

if there is a target keyword matching with the word information in the keyword information, store the notification message to an independent storage area corresponding to the target keyword; and if there is no target keyword matching with the word information in the keyword information, store the notification message to a common message storage area.

7. A smart wearable device, comprising a processor and an input display, wherein the processor is configured to perform steps of the processing method for the notification message according to claim 1, wherein the input display is connected to the processor and is configured to receive classification identifiers input by a user and keyword information corresponding to the classification identifiers, and the input display transmits the classification identifiers and keyword information corresponding to the classification identifiers to the processor.

8. The smart wearable device according to claim 7, further comprising a positioner configured to collect current location information of the smart wearable device, wherein the input display is configured to receive location information added for a target classification identifier, and transmit the target classification identifier and its corresponding location information to the processor, wherein the target classification identifier is any one of all the classification identifiers, and wherein the processor is configured to record corresponding relationship between location information and the storage area corresponding to the target classification identifier when the location information corresponding to the target classification identifier is acquired.

* * * * *